(12) United States Patent
Leland

(10) Patent No.: US 8,653,198 B2
(45) Date of Patent: Feb. 18, 2014

(54) METHOD FOR THE PREPARATION OF A HETEROPHASIC COPOLYMER AND USES THEREOF

(75) Inventor: Mark Leland, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 12/411,833

(22) Filed: Mar. 26, 2009

(65) Prior Publication Data

US 2010/0249327 A1    Sep. 30, 2010

(51) Int. Cl.
*C08L 23/10* (2006.01)
*C08L 23/16* (2006.01)

(52) U.S. Cl.
USPC .............................. 525/240; 525/50; 525/191

(58) Field of Classification Search
USPC ........................................... 525/50, 191, 240
See application file for complete search history.

(56) References Cited

U.S. PATENT DOCUMENTS

| | | | | |
|---|---|---|---|---|
| 5,258,464 A | * | 11/1993 | McCullough et al. | 525/244 |
| 5,362,782 A | * | 11/1994 | McCullough et al. | 524/108 |
| 6,511,755 B1 | * | 1/2003 | Mochizuki et al. | 428/516 |
| 2005/0054781 A1 | * | 3/2005 | Dharmarajan et al. | 525/240 |
| 2005/0234196 A1 | * | 10/2005 | Kim et al. | 525/191 |
| 2007/0010616 A1 | * | 1/2007 | Kapur et al. | 524/525 |
| 2008/0070994 A1 | * | 3/2008 | Li et al. | 514/788.1 |
| 2010/0249329 A1 | | 9/2010 | Grein et al. | |

FOREIGN PATENT DOCUMENTS

WO    2004055101 A1    7/2004

OTHER PUBLICATIONS

Mehrabzadeh, M. et al Journal of Applied Polymer Science vol. 72, pp. 1257-1265, published in Jun. 1999.*

* cited by examiner

*Primary Examiner* — Irina S Zemel
*Assistant Examiner* — Jeffrey Lenihan

(57) ABSTRACT

Methods for preparing an impact copolymer by selecting a continuous phase polymer having a first melt flow rate and selecting a rubber phase polymeric material such that the final melt flow rate of the impact copolymer is within 2 g/10 min of the first melt flow rate. Impact copolymers made from such methods and films and molded articles produced from such impact copolymers are also included.

19 Claims, 2 Drawing Sheets

METHOD FOR THE PREPARATION OF A HETEROPHASIC COPOLYMER AND USES THEREOF

FIELD

Embodiments of the present invention generally relate to heterophasic copolymers (also referred to as impact copolymers) for use in end use applications, including films and molded articles.

BACKGROUND

It has been observed that impact copolymers provide materials that have particular physical properties, such as good impact strength and improved toughness.

However, the high haze of impact copolymers limits the applications for which these materials can be utilized. Impact copolymers also have a tendency to stress whiten.

Therefore, a need exists to develop an impact copolymer having improved optical properties, such as lower haze and decreased stress whitening, while maintaining the physical properties of the impact copolymer.

SUMMARY

Embodiments of the present invention include methods for preparing an impact copolymer having increased clarity. One embodiment of the methods generally includes preparing an impact copolymer by selecting a continuous phase polymer having a first melt flow rate; and selecting a rubber phase polymeric material such that the final melt flow rate of the impact copolymer is within 2 g/10 min of said first melt flow rate.

Another embodiment includes an impact copolymer prepared by the methods described. Yet another embodiment includes films and molded articles produced from the impact copolymer prepared by the methods described.

DETAILED DESCRIPTION

Introduction and Definitions

Figure 1:
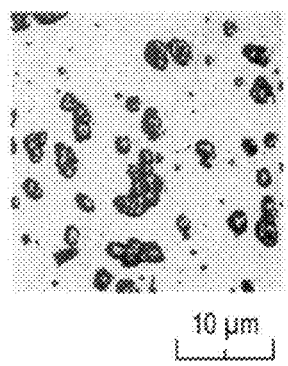
FIG. 1 presents the Atomic Force Microscopy (AFM) Image of 7C92.
Figure 2:
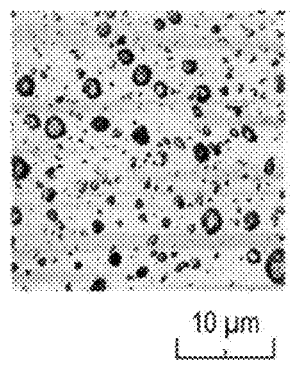
FIG. 2 presents the AFM Image of 7C93.
Figure 3:
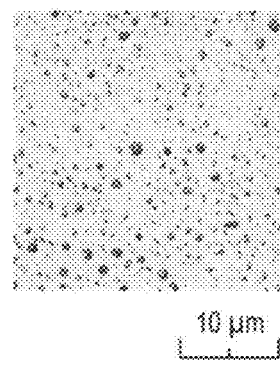
FIG. 3 presents the AFM Image of 7C94.
Figure 4:
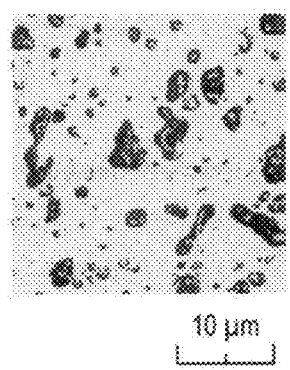
FIG. 4 presents the AFM Image of 7C95.
Figure 5:
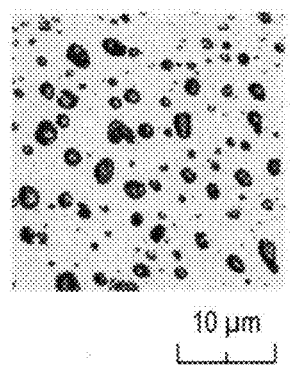
FIG. 5 presents the AFM Image of 7C97.
Figure 6:
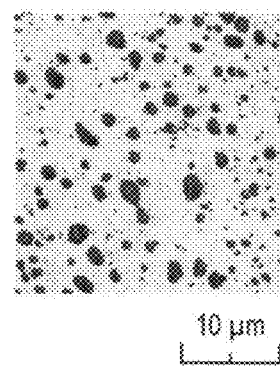
FIG. 6 presents the AFM Image of 7C99.

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

Embodiments of the invention generally include heterophasic polymers and process of forming the same. As used herein, the term "heterophasic" generally refers to a polymer having two or more phases. For example, the first phase may include a homopolymer, such as polypropylene, or a copolymer, such as a random copolymer formed from propylene and ethylene. Such first phase is also referred to herein as a continuous phase polymer. Unless otherwise specified, the term propylene homopolymers include those polymers composed primarily of propylene and limited amounts of other comonomers, such as ethylene, wherein the comonomer make up less than about 2 wt. % (e.g., mini random copolymers), or less than about 0.5 wt. % or less than about 0.1 wt. % by weight of polymer.

The second phase generally includes a rubber phase, such as ethylene-propylene rubber. Such second phase is also referred to herein as a rubber phase polymeric material. The incorporation of the rubber phase into the polymer matrix generally improves impact properties. As a result, the heterophasic polymers may also be referred to as impact copolymers.

As used herein, "bimodal" refers to a resin and polymerization process for producing a resin having a distinct low molecular weight portion and a distinct high molecular weight portion.

Catalyst Systems

Catalyst systems useful for polymerizing olefin monomers include any catalyst system known to one skilled in the art. For example, the catalyst system may include metallocene catalyst systems, single site catalyst systems, Ziegler-Natta catalyst systems or combinations thereof, for example. As is known in the art, the catalysts may be activated for subsequent polymerization and may or may not be associated with a support material. A brief discussion of such catalyst systems is included below, but is in no way intended to limit the scope of the invention to such catalysts.

For example, Ziegler-Natta catalyst systems are generally formed from the combination of a metal component (e.g., a catalyst) with one or more additional components, such as a catalyst support, a cocatalyst and/or one or more electron donors, for example.

Metallocene catalysts may be characterized generally as coordination compounds incorporating one or more cyclopentadienyl (Cp) groups (which may be substituted or unsubstituted, each substitution being the same or different) coordinated with a transition metal through π bonding. The substituent groups on Cp may be linear, branched or cyclic hydrocarbyl radicals, for example. The cyclic hydrocarbyl radicals may further form other contiguous ring structures, including indenyl, azulenyl and fluorenyl groups, for example. These contiguous ring structures may also be substituted or unsubstituted by hydrocarbyl radicals, such as $C_1$ to $C_{20}$ hydrocarbyl radicals, for example.

Polymerization Processes

As indicated elsewhere herein, catalyst systems are used to form polyolefin compositions. Once the catalyst system is prepared, as described above and/or as known to one skilled in the art, a variety of processes may be carried out using that composition. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example. (See, U.S. Pat. No. 5,525,678; U.S. Pat. No. 6,420,580; U.S. Pat. No. 6,380,328; U.S. Pat. No. 6,359,072; U.S. Pat. No. 6,346,586; U.S. Pat. No. 6,340,730; U.S. Pat. No. 6,339,134; U.S. Pat. No. 6,300,436; U.S. Pat. No. 6,274,684; U.S. Pat. No. 6,271,323; U.S. Pat. No. 6,248,845; U.S. Pat. No. 6,245,868; U.S. Pat. No. 6,245,705; U.S. Pat. No. 6,242,545; U.S. Pat. No. 6,211,105; U.S. Pat. No. 6,207,606; U.S. Pat. No. 6,180,735 and U.S. Pat. No. 6,147,173, which are incorporated by reference herein.)

In certain embodiments, the processes described above generally include polymerizing one or more olefin monomers to form polymers. The olefin monomers may include $C_2$ to $C_{30}$ olefin monomers, or $C_2$ to $C_{12}$ olefin monomers (e.g., ethylene, propylene, butene, pentene, methylpentene, hexene, octene and decene), for example. The monomers may include ethylenically unsaturated monomers, $C_4$ to $C_{18}$ diolefins, conjugated or nonconjugated dienes, polyenes, vinyl monomers and cyclic olefins, for example. Non-limiting examples of other monomers may include norbornene, nobornadiene, isobutylene, isoprene, vinylbenzocyclobutane, sytrene, alkyl substituted styrene, ethylidene norbornene, dicyclopentadiene and cyclopentene, for example. The formed polymer may include homopolymers, copolymers or terpolymers, for example.

Examples of solution processes are described in U.S. Pat. No. 4,271,060, U.S. Pat. No. 5,001,205, U.S. Pat. No. 5,236,998 and U.S. Pat. No. 5,589,555, which are incorporated by reference herein.

One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C., for example. (See, for example, U.S. Pat. No. 4,543,399; U.S. Pat. No. 4,588,790; U.S. Pat. No. 5,028,670; U.S. Pat. No. 5,317,036; U.S. Pat. No. 5,352,749; U.S. Pat. No. 5,405,922; U.S. Pat. No. 5,436,304; U.S. Pat. No. 5,456,471; U.S. Pat. No. 5,462,999; U.S. Pat. No. 5,616,661; U.S. Pat. No. 5,627,242; U.S. Pat. No. 5,665,818; U.S. Pat. No. 5,677,375 and U.S. Pat. No. 5,668,228, which are incorporated by reference herein.)

Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid under the conditions of polymerization and relatively inert. A bulk phase process is similar to that of a slurry process with the exception that the liquid medium is also the reactant (e.g., monomer) in a bulk phase process. However, a process may be a bulk process, a slurry process or a bulk slurry process, for example.

In a specific embodiment, a slurry process or a bulk process may be carried out continuously in one or more loop reactors. The catalyst, as slurry or as a dry free flowing powder, may be injected regularly to the reactor loop, which can itself be filled with circulating slurry of growing polymer particles in a diluent, for example. Optionally, hydrogen may be added to the process, such as for molecular weight control of the resultant polymer. The loop reactor may be maintained at a pressure of from about 27 bar to about 50 bar or from about 35 bar to about 45 bar and a temperature of from about 38° C. to about 121° C., for example. Reaction heat may be removed through the loop wall via any method known to one skilled in the art, such as via a double-jacketed pipe or heat exchanger, for example. Alternatively, other types of polymerization processes may be used, such as stirred reactors in series, parallel or combinations thereof, for example.

In one or more embodiments, the impact copolymers are formed by incorporating a rubber fraction into the polymer matrix by methods known to one skilled in the art, such as via mechanical blending or co-polymerization, for example. The co-polymerization process may include at least two stages, wherein the propylene homopolymer is produced in a first reaction zone, the product of which is transferred to a second reaction zone for contact with a comonomer and additional propylene monomer.

Embodiments of the invention generally include contacting the propylene homopolymer with ethylene and additional propylene monomer to form a resulting polymer having greater than 2 wt. %, or greater than 4 wt. %, or greater than 8 wt. %, or greater than 10 wt. %, or greater than 12 wt %, or greater than 14 wt % ethylene; or from 2 wt. % to 14 wt. %, or from 4 wt % to 12 wt %, or from 8 wt % to 10 wt % ethylene.

The R ratio, which is the ethylene content of the rubber and is described further below, is the ratio of ethylene to propylene. Increased propylene character is achieved by decreasing the R ratio, which is achieved by modifying the ratio of ethylene to propylene in the second reactor of the heterophasic polymer production process. Modifying the rubber intrinsic viscosity, further defined below, is achieved by increasing the hydrogen content, which results in chain termination in the second reactor.

Polymer Product

Upon removal from the reactor, the polymer may be passed to a polymer recovery system for further processing, such as addition of additives and/or extrusion, for example.

In the embodiments described herein, the polymer, which may also be referred to herein as a heterophasic copolymer, is propylene based. As used herein, the term "propylene based" refers to a polymer having at least about 80 wt. %, or at least about 85 wt. % or at least about 90 wt. % polypropylene.

In an embodiment, the polypropylene based polymer generally has a melt flow rate of from 0.5 g/10 min. to 20 g/10 min., or from 4 g/10 min. to 15 g/10 min., or from 6 g/10 min. to 13 g/10 min., or from 8 g/10 min. to 11 g/10 min.

In an embodiment, the impact copolymer generally has a melt flow rate of from 0.5 g/10 min. to 10 g/10 min., or from 4 g/10 min. to 8 g/10 min., or from 5 g/10 min to 7.5 g/10 min.

An impact copolymer, as described above, has a first phase that, in one embodiment, may include the polypropylene-based homopolymer and a second phase that may include a rubber phase, such as an ethylene-propylene rubber. In one embodiment, the intrinsic viscosity of the rubber phase may be from 1.0 dl/g to 3.0 dl/g, or from 1.4 dl/g to 2.4 dl/g, or from 1.8 dl/g to 2.2 dl/g or from 1.9 dl/g to 2.0 dl/g. In one embodiment the viscosity of the continuous phase polymer may be from 1.0 dl/g to 3.0 dl/g, or from 1.4 dl/g to 2.4 dl/g, or from 1.8 dl/g to 2.2 dl/g or from 1.9 dl/g to 2.0 dl/g. In one embodiment, the viscosity of the rubber phase may be from 1.0 dl/g to 3.0 dl/g, or from 1.4 dl/g to 2.4 dl/g, or from 1.8 dl/g to 2.2 dl/g or from 1.9 dl/g to 2.0 dl/g.

In one embodiment, the ethylene content of the impact copolymer may be from 5 wt % to 15 wt %, or from 7 wt % to 14 wt %, or from 8 wt % to 12 wt %, or from 9 wt % to 11 wt %.

In one embodiment, the R ratio may be from 0.25 to 0.50, or from 0.30 to 0.45, or from 0.32 to 0.41.

In one embodiment, the impact copolymer may have a melting point, measured by DSC, from 135° C. to 170° C., or from 140° C. to 165° C., or from 145° C. to 160° C.

In one embodiment, the impact copolymer may have a xylene soluble fraction of from 15 wt % to 25 wt %, or from 16 wt % to 20 wt %, or from 17 wt % to 18.5 wt %.

In one embodiment, the impact copolymer may have an acetone insoluble fraction of from 10 wt % to 25 wt %, or from 15 wt % to 20 wt %, or from 16 wt % to 17 wt %.

In one embodiment, the impact copolymer may have an Mn of from 25,000 to 80,000, or from 35,000 to 75,000, or from 40,000 to 55,000. In one embodiment, the impact copolymer may have an Mw of from 150,000 to 450,000, or from 225,000 to 350,000, or from 275,000 to 325,000. In one embodiment, the impact copolymer may have an Mz of from 450,000 to 1,500,000, or from 600,000 to 1,250,000, or from 700,000 to 1,000,000.

In one embodiment, the ethylene-propylene rubber phase may have a % Et in XSAI (xylene solubles-acetone insolubles), by NMR, of from 30 wt % to 50 wt %, or from 35 wt % to 45 wt %, or from 40 wt % to 45 wt %. In one embodiment, the ethylene-propylene rubber phase may have a % Et in Pellet, by NMR, of from 7 wt % to 15 wt %, or from 8 wt % to 12 wt %, or from 9 wt % to 11 wt %.

In one embodiment, the first phase of the impact copolymer may be a random copolymer. Two monomers, such as propylene and a comonomer, may be introduced into the first reactor to form a random copolymer rather than a homopolymer. Typically comonomer levels are between 0.1% and 4% by weight. The preferred comonomer is ethylene.

In one embodiment, additives may also be included in the final composition. Nucleators may include any nucleator known to one skilled in the art. For example, non-limiting examples of nucleators may include carboxylic acid salts, including sodium benzoate, talc, phosphates, metallic-silicate hydrates, organic derivatives of dibenzylidene sorbitol, sorbitol acetals, organophosphate salts and combinations thereof. In one embodiment, the nucleators are selected from Amfine Na-11 and Na-21, commercially available from Amfine Chemical, Milliken HPN-68, and Millad 3988, commercially available from Milliken Chemical.

In an embodiment, the nucleators may be used in concentrations of from about 0 to about 3000 ppm, or from about 5 ppm to about 1000 ppm or from about 10 ppm to about 500 ppm by weight of the polymer, for example.

The additives may contact the polymer by any method known to one skilled in the art. For example, the additives may contact the polymer prior to extrusion (within the polymerization process) or within the extruder, for example. In one embodiment, the additives contact the polymer independently. In another embodiment, the additives are contacted with one another prior to contacting the polymer. In one embodiment, the contact includes blending, such as mechanical blending, for example.

Product Application

The polymers and blends thereof are useful in applications known to one skilled in the art, such as forming operations (e.g., film, sheet, pipe and fiber extrusion and co-extrusion as well as blow molding, injection molding and rotary molding). Films include blown or cast films formed by co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include melt spinning, solution spinning and melt blown fiber operations for use in woven or non-woven form to make filters, diaper fabrics, medical garments and geotextiles, for example. Extruded articles include medical tubing, wire and cable coatings, geomembranes and pond liners, for example. Molded articles include single and multi-layered constructions in the form of bottles, tanks, large hollow articles, rigid food containers and toys, for example.

In particular, the polymers are useful for cast film applications. In one example of a cast film process, a polymer is extruded out of a flat die face and cooled rapidly (typically on a chilled roll) to form a film with a thickness which can range from 0.4 mil to 15 mil.

Additionally, the polymers are useful for injection molded parts and injection stretch blow molding (ISBM). In one example of an injection molding process, material is mechanically and thermally heated in a screw and driven into a closed cavity to form a finished part. In one example of an ISBM process, hollow parts (known as preforms) are formed in an injection molding process. The parts are subsequently heated stretched and blown with air to form a hollow part with a thinner wall thickness than the preform.

In one embodiment, the films produced may have haze properties of from 5% to 85%, or from 6% to 60%, or from 25% to 55%. In one embodiment, the films produced may have gloss at 45° of from 5% to 65%, or from 7.5% to 25%, or from 9% to 12%.

In one embodiment, the films produced may have an average particle size, measured using AFM, of from 0.50 μm to 4.0 μm, or from 0.7 μm to 3.5 μm, or from 1.0 to 2.7 μm, or from 1.5 μm to 2.1 μm.

In one embodiment, the films produced may have a 1% secant modulus of from 55 kpsi to 110 kpsi, or from 70 kpsi to 95 kpsi, or from 80 kpsi to 90 kpsi. In one embodiment, the films produced may have tensile strength at yield of from 2000 psi to 4000 psi, or from 2400 psi to 3000 psi, or from 2500 psi to 2800 psi. In one embodiment, the films produced may have an elongation at yield of from 7.5% to 15%, or from 8% to 12%, or from 9% to 11%.

In one embodiment, the films produced may have a dart drop of from 300 g to greater than 1200 g, or from 300 g to 600 g, or from 400 g to 500 g. In one embodiment, the films produced may have an Elmendorf Tear in the machine direction of from 150 g to 250 g, or from 160 g to 200 g, or from 175 g to 190 g. In one embodiment, the films produced may have a film puncture of from 1.5 in-lbs to 2.5 in-lbs, or from 1.7 in-lbs to 2.2. in-lbs, or from 1.8 in-lbs to 2.0 in-lbs.

Figure 7:
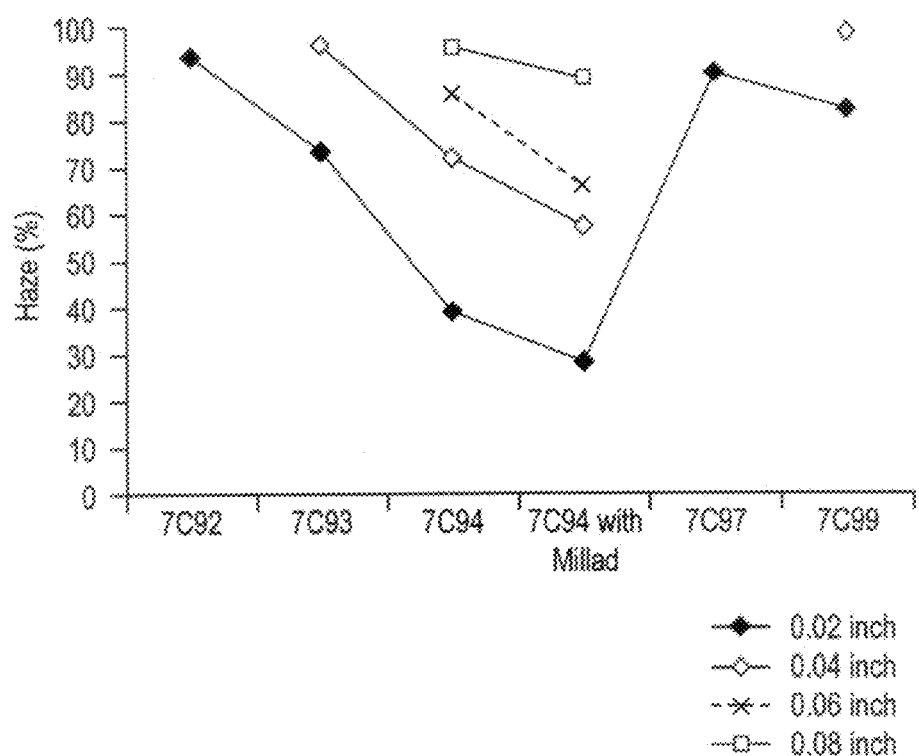
FIG. 7 illustrates the optical testing results of injection molded step chips.

In one embodiment, the injection molded articles produced may have haze properties at a sample thickness of 0.02 inches of from 20% to 95%, or from 30% to 80%, or from 40% to 70%. Additional examples of the haze properties of injection molded articles at varying thicknesses is illustrated in FIG. 7.

In one embodiment, the injection molded articles produced may have a flexural modulus of from 90 kpsi to 250 kpsi, or from 150 kpsi to 200 kpsi, or from 175 kpsi to 190 kpsi. In one embodiment, the injection molded articles produced may have a tensile modulus of from 100 kpsi to 250 kpsi, or from 150 kpsi to 200 kpsi, or from 170 kpsi to 190 kpsi. In one embodiment, the injection molded articles produced may have a tensile strength at yield of from 2500 psi to 4500 psi, or from 3000 psi to 4000 psi, or from 3500 psi to 3800 psi. In one embodiment, the injection molded articles produced may have a tensile strength at break of from 1500 psi to 3000 psi, or from 1700 psi to 2500 psi, or from 1800 psi to 2300 psi.

In one embodiment, the injection molded articles produced may have an elongation at yield of from 5% to 15%, or from 6% to 11%, or from 7% to 9%. In one embodiment, the injection molded articles produced may have an annealed heat distortion of from 150° F. to 200° F., or from 170° F. to 190° F.

In one embodiment, the ISBM article produced may have haze properties of from 10% to 90%, or from 20% to 80%, or from 50% to 70%. In one embodiment, the ISBM article produced may have a gloss at 45° of from 10% to 65%, or from 15% to 60%, or from 20% to 50%.

In one embodiment, the ISBM article produced may have a bumper compression with a load at 0.5 in deflection of from 50 N to 110 N, or from 75 N to 100 N, or from 90 N to 100 N. In one embodiment, the ISBM article produced may have a top load of from 70 N to 140 N, or from 90 N to 120 N, or from 100 N to 110 N.

EXAMPLES

The following test methods were used in evaluating the polymer and resulting end use products. Haze: ASTM D1003; Gloss: ASTM D-2457-70; Dart Drop: ASTM D1709; Elmendorf Tear: ASTM D-1922-89; Puncture resistance: force per unit area to puncture a 2 mil film with a 3.17 mm diameter tip at a speed of 20 in/min; Rubber particle size: atomic force microscopy (AFM); Melt flow rate: ASTM D1238; Differential Scanning Calorimetry (DSC): ASTM D3417 performed at a 10° C./min ramp rate; Intrinsic viscosity: measured by ASTM D5225 and calculated by the formula described below; Xylene solubles: ASTM D5492; Acetone Insolubles: calculated as the weight fraction of xylene solubles precipitated in acetone.

Six sample materials were prepared having the characteristics described below (Table 2), using a standard Ziegler-Natta catalyst available from Basell. 7C92 is a 7 MFR ICP targeted for cast film applications. 7C93 and 7C94 represent progressively lower rubber intrinsic viscosity (IV). For 7C97, the IV is similar to the control, but the R ratio (ratio of ethylene to propylene) has been adjusted to increase the propylene character of the IV rubber. 7C95 has similar rubber composition as the control but with a bimodal composition of the homopolymer phase. Finally, 7C99 has more propylene content in the ethylene-propylene rubber (EPR) and has a low level of ethylene in the continuous phase, at 4 wt %. The presence of a random copolymer continuous phase makes this material a random heterophasic copolymer (RaHeCo).

Samples were prepared according to the parameters described above. Pellets were tested to verify the composition of the experimental resins. The results appear in Table 1 below. The samples have reasonably similar MFR for testing purposes. With respect to the R ratio, NMR data on the xylene soluble/acetone insoluble (XSAI) portion of the sample shows reasonable correlation to the R ratio targeted. Rubber content, based on the percent of XSAI, varied slightly in the samples ranging from approximately 15% to 17% for most of the samples. The exception is 7C99 sample which showed a much higher XSAI (20%) than the other materials. The calculated intrinsic viscosity of the rubber as calculated from GPC of the XSAI fraction shows a similar trend to the targeted rubber IV. The calculated intrinsic viscosity was calculated using the following formula, $[\eta]=-0.1436+0.0015 (Mw)^{0.595}$, where $[\eta]$ is the intrinsic viscosity and Mw is the weight average molecular weight. Those of ordinary skill in the art understand that, for a linear polymer, there is a direct relationship between $\log [\eta]$ and $\log [Mw]$.

TABLE 1

Measured versus reported properties of pellet samples

| Test | Value | Unit | 7C92 Control | 7C93 Low IV | 7C94 Lowest IV | 7C95 Bimodal | 7C97 Low R | 7C99 RaHeCo |
|---|---|---|---|---|---|---|---|---|
| Reported | MFR | g/10 min | 7.2 | 6.8 | 6.0 | 5.8 | 7.9 | 7.3 |
| | IV Rubber | dl/g | 2.6 | 1.8 | 1.4 | 2.4 | 2.2 | 2 |
| | C2 content | % | 10.3 | 10.9 | 8.1 | 12 | 7.8 | 9.4 |
| | R ratio (target) | | 0.41 | 0.41 | 0.41 | 0.41 | 0.32 | 0.32 |
| MFR | MFR | g/10 min | 7.6 | 7.3 | 6.7 | 6.3 | 7.7 | 6.6 |
| DSC | Tm | ° C. | 164.1 | 163.3 | 164.7 | 162.7 | 163.6 | 144.4 |
| Extraction | Xylene Solubles | % | 16.1 | 17.2 | 16.9 | 18.3 | 18.1 | 21.2 |
| | Acetone Insol | % | 14.9 | 16.3 | 15.1 | 16.9 | 16.9 | 20.1 |
| NMR | % E in XSAI | wt % | 41.6 | 43.4 | 41.9 | 43.8 | 37.7 | 32.4 |
| | % E in Pellet | wt % | 9.9 | 10.4 | 9.4 | 11.5 | 8.8 | 10.2 |
| GPC (for XSAI) | Mn | g/mol | 65,000 | 49,000 | 37,000 | 71,000 | 52,000 | 28,000 |
| | Mw | g/mol | 414,000 | 238,000 | 169,000 | 433,000 | 320,000 | 277,000 |
| | MZ | g/mol | 1,246,000 | 655,000 | 452,000 | 1,300,000 | 992,000 | 1,008,00 |
| | PDI | | 6.4 | 4.8 | 4.5 | 6.1 | 6.1 | 9.9 |
| | Calc IV | dl/g | 3.1 | 2.2 | 1.8 | 3.2 | 2.7 | 2.4 |

Samples were used to prepare 2 mil cast films using a mini-sheet line which consists of a 1.25 inch Welex extruder and a 3 roll stack. The following set points were used: Zone 1 400° F., Zone 2—420° F., Zone 3—450° F., Die 1—470° F., Die 2—470° F. Die gap was set at 20 mil. Extruder RPM and take up were adjusted to achieve a 20 mil film. Film samples were tested for optics and physical properties according to standard testing procedures. In addition to film samples, injection molded parts and ISBM bottles were prepared from some of the materials as described below.

Results from the 2 mil films are summarized in Table 2. From optical measurements, the haze was most affected by the IV of the rubber with lower IV resulting in significantly lower haze. A smaller effect is seen with adjusting the R ratio. Interestingly, it is noted that the target MFR of the continuous phase matches the final MFR in the product for 7C94 (Table 7, below), which in turn resulted in the lowest haze. This suggests that at the selected IV the rubber has a minimal effect on the final viscosity suggesting a viscosity match of the two components.

The use of a bimodal matrix in 7C95 had no apparent impact on the film optics. Sample 7C97 shows a slightly lower haze suggesting that increasing the propylene content of the EPR does improve optics but the effect is not as significant as adjusting the rubber IV. Like 7C97, the haze was slightly lower for 7C99, the random hetrophasic copolymer (RaHeCo) but again the effect was not as significant as adjusting the rubber IV.

In order to better understand the origin of the improvement in haze, each sample was evaluated with AFM to assess the relative particle size of the EPR. The results demonstrate a relatively good correlation with average particle size with larger average particle size resulting in higher haze, FIGS. 1-6 demonstrate the particle size of the EPR within the polymer samples using AFM imaging.

TABLE 2

Optical and AFM measurements of 2 mil films.

| | Value | Units | 7C92 Control | 7C93 Low IV | 7C94 Lowest IV | 7C95 Bimodal | 7C97 Low R | 7C99 RaHeCo |
|---|---|---|---|---|---|---|---|---|
| Optics | Haze | % | 74.2 | 28.5 | 6.2 | 80.5 | 59 | 51.7 |
| | Gloss, 45 | % | 7.5 | 20.1 | 63.4 | 5.9 | 9.6 | 11.5 |
| AFM Particle Size | Average | μm | 3.59 | 1.78 | 0.79 | 3.46 | 2.67 | 2.05 |
| | Std Dev | μm | 1.41 | 0.64 | 0.29 | 1.22 | 0.92 | 0.73 |

Film samples were subsequently evaluated for physical properties to determine the effect of the compositional changes on the resulting film (Table 3). With respect to film stiffness, the secant modulus results for 7C92, 7C93, 7C95, and 7C97 are considered the same within the experimental error of the test. The 7C94 film does show slightly higher stiffness and the 7C99 shows significantly lower stiffness.

Dart drop and puncture resistance represent important properties for film. Typically, the use of impact copolymer is to impart better film toughness which is represented by these two test values. The results show parity in dart drop values for 7C92, 7C93, and 7C94. A lower dart drop value is found for 7C95 and higher values for 7C97 and 7C99. It must be noted that the rubber content as measured by XSAI did differ in the samples and may account for a portion of the differences. However, rubber content differed very little between 7C94 and 7C92 as did dart drop values, suggesting the smaller EPR particle size in 7C94 did not negatively impact this film property. For 7C97, it is believed that the higher dart drop value may be associated with the higher rubber content of this particular sample, so it is difficult to interpret the impact of R ratio on the dart response. The result in the bimodal sample, 7C95, suggests that the matrix composition does play a significant role in the dart properties. Dart drop values were exceptionally high for 7C99, possibly due to the random copolymeric nature of the continuous (or first) phase.

TABLE 3

Physical properties of 2 mil films.

| Value | Units | 7C92 Control | 7C93 Low IV | 7C94 Lowest IV | 7C95 Bimodal | 7C97 Low R | 7C99 RaHeCo |
|---|---|---|---|---|---|---|---|
| Acetone Insol | % | 14.9 | 16.3 | 15.1 | 16.9 | 16.9 | 20.1 |
| 1% Secant Mod | kpsi | 90 | 89 | 105 | 87 | 94 | 56 |
| Tens Str @ yield | psi | 2558 | 2569 | 2998 | 2448 | 2712 | 2150 |
| Elongation @ yield | % | 8.8 | 9.4 | 10.3 | 8 | 9.7 | 14.1 |

TABLE 3-continued

Physical properties of 2 mil films.

| Value | Units | 7C92 Control | 7C93 Low IV | 7C94 Lowest IV | 7C95 Bimodal | 7C97 Low R | 7C99 RaHeCo |
|---|---|---|---|---|---|---|---|
| Dart Drop | g | 483 | 491 | 497 | 335.2 | 573 | >1270 |
| Elmendorf Tear MD | g | 158.7 | 184.3 | 236.7 | 164 | 157.6 | 193.4 |
| Film Puncture | In-lbs | 1.706 | 2.102 | 1.92 | 1.626 | 2.121 | 1.788 |
| WVTR | g/100 in2/day | 0.63 | 0.55 | 0.54 | 0.62 | 0.57 | 0.68 |

In order to further evaluate the comparative performance of the materials, samples were injection molded to form step chips for optical measurements, dogbones for Instron measurements, and discs for instrumented impact tests. The sample 7C95 was not included in subsequent testing due to unremarkable results in previous tests. However, an additional sample was prepared by incorporating Millad 3988 at a loading of 2000 ppm in 7C94 which showed the best optical performance. Samples were molded according to ASTM D4101; tensile testing on dogbones was performed according to ASTM D638 and flex modulus was performed according to ASTM D790.

Results of haze testing on step chips are shown in FIG. 7. Note that haze was not tested on thicker steps once the haze level exceeded 90%. As with the film samples the lowest haze was found for 7C94 among the original samples. The incorporation of Millad 3988 resulted in a slight improvement in haze. Similar to the results on cast films, injection molded samples show improvement in optics with progressively lower rubber IV.

Results of physical testing of the injection molded samples are shown in Table 4. Generally, the physical properties of the materials are similar with the exceptions of 7C99 and the 7C94 containing Millad. The random heterophasic copolymer, 7C99, shows a lower modulus, tensile strength, and heat distortion temperature with respect to the other samples. The sample containing Millad shows higher modulus, tensile strength, and heat distortion temperature. The results suggest that for room temperature properties the modification of the material, in terms of R ratio and rubber IV, does not significantly alter the physical properties. Thus, the improvement in optics does not come at a high cost to physical properties.

TABLE 4

Physical properties of injection molded samples.

| Value | Units | 7C92 | 7C93 | 7C94 | 7C94 w/ Millad | 7C97 | 7C99 |
|---|---|---|---|---|---|---|---|
| Flex Mod (Chord 4-8 N) | kpsi | 193 | 187 | 183 | 202 | 178 | 95 |
| Tensile Modulus | kpsi | 195 | 169 | 191 | 220 | 188 | 114 |
| Tensile Strength @ Yield | psi | 3800 | 3500 | 3800 | 4100 | 3800 | 2800 |
| Elongation @ Yield | % | 5.4 | 6.6 | 8.6 | 7.9 | 6.2 | 10.4 |
| Tensile Srength @ Break | psi | 1800 | 1800 | 2300 | 2500 | 1600 | 2600 |
| Annealed heat distortion | ° F. | 186 | 183 | 180 | 199 | 184 | 154 |

Samples were evaluated at three different temperatures using instrumented impact (Table 5). Results were similar for the samples for 72° F. and 32° F. In general, the control sample, 7C92, exhibited slightly better impact properties. There was a loss of toughness in the samples with lower rubber IV, as indicated by lower Total Energy values for all of the experimental samples but property loss was only around 15% for the sample with the best optics, 7C94. However, at −4° F., 7C94 shows extremely poor impact properties. The results suggest that while reduction of rubber IV has a minimal effect on the impact resistance of the material at ambient temperatures, below the glass transition of the material the impact resistance is compromised.

TABLE 5

Instrumented impact results for molded discs.

| Temp | Units | | Units | 7C92 | 7C93 | 7C94 | 7C94 w/ Millad | 7C97 | 7C99 |
|---|---|---|---|---|---|---|---|---|---|
| 72° F. | Impact Velocity | | ft/sec | 28.2 | 28.3 | 28.2 | 28.2 | 28.1 | 28.2 |
| | Impact Energy | | ft-lbs | 89.7 | 90.0 | 89.7 | 89.5 | 88.9 | 89.5 |
| | Maximum Load | | lbf | 544 | 530 | 526 | 553 | 535 | 467 |
| | Energy to Max Load | | ft-lbs | 13.6 | 13.0 | 12.9 | 13.5 | 13.3 | 11.7 |

TABLE 5-continued

Instrumented impact results for molded discs.

| Temp | Units | Units | 7C92 | 7C93 | 7C94 | 7C94 w/ Millad | 7C97 | 7C99 |
|---|---|---|---|---|---|---|---|---|
| | Energy After Max Load | ft-lbs | 13.3 | 11.1 | 10.2 | 11.0 | 12.3 | 10.9 |
| | Total Energy | ft-lbs | 26.9 | 24.1 | 23.0 | 24.5 | 25.6 | 22.6 |
| | Ductile/Brittle Failures | | 0/5 | 0/5 | 0/5 | 0/5 | 0/5 | 0/5 |
| 32° F. | Impact Velocity | ft/sec | 28.2 | 28.2 | 28.2 | 28.2 | 28.1 | 28.1 |
| | Impact Energy | ft-lbs | 89 | 90 | 90 | 89 | 89 | 89 |
| | Maximum Load | lbf | 665 | 667 | 667 | 686 | 648 | 608 |
| | Energy to Max Load | ft-lbs | 16.8 | 15.8 | 15.8 | 15.9 | 15.0 | 14.3 |
| | Energy After Max Load | ft-lbs | 12.3 | 12.5 | 11.8 | 10.3 | 10.3 | 12.0 |
| | Total Energy | ft-lbs | 29.1 | 28.3 | 27.5 | 26.2 | 25.3 | 26.2 |
| | Ductile/Brittle Failures | | 1/4 | 0/5 | 0/5 | 1/4 | 0/5 | 0/5 |
| −4° F. | Impact Velocity | ft/sec | 28.1 | 28.1 | 28.1 | 28.1 | 28.1 | 28.1 |
| | Impact Energy | ft-lbs | 89 | 89 | 89 | 89 | 89 | 89 |
| | Maximum Load | lbf | 839 | 819 | 246 | 118 | 753 | 790 |
| | Energy to Max Load | ft-lbs | 19.3 | 17.1 | 2.6 | 0.6 | 15.6 | 17.1 |
| | Energy After Max Load | ft-lbs | 9.1 | 5.9 | 0.29 | 0.62 | 6.38 | 5.37 |
| | Total Energy | ft-lbs | 28.4 | 23.0 | 2.9 | 1.2 | 22.0 | 22.5 |
| | Ductile/Brittle Failures | | 1/4 | 0/5 | 0/5 | 0/5 | 1/4 | 1/4 |

As a final study on these materials, each resin was used to mold preforms on Netstal injection molder using a 23 g preform mold. The preforms were conditioned at room temperature for at least 24 hours before they were stretch-blow-molded into bottles on ADS G62 linear injection stretch blow molder (ISBM). Preforms were tested for optics, top load strength, bumper compression, and drop test performance (Table 6). Top load testing and bumper compression represent compression testing of the bottles in vertical and horizontal configurations, respectively. Drop testing is performed on filled bottles conditioned at 40° F. and dropped from a height of six feet on the bottoms and sides of the bottle.

For optical measurements (taken at the bottle side wall), the results with ISBM were consistent with observations in films and injection molded parts The reduction in rubber IV resulted in the most improvement in clarity. The sample with a lower R ratio, 7C97 and the RaHeCo sample, 7C99 both showed some improvement in clarity. Bumper compression and top load testing of the bottles show a small reduction in stiffness for the lower rubber IV samples. In drop test performance testing, the control, 7C92 actually performed relatively poorly with the other samples performing better. Consequently, the modifications made to the ICP composition did not appear to negatively impact the drop test performance of the bottles.

TABLE 6

Properties of ISBM bottles prepared with POPP2 samples.

| Test | Value | Units | 7C92 | 7C93 | 7C94 | 7C95 | 7C97 | 7C99 |
|---|---|---|---|---|---|---|---|---|
| Optics | Haze | % | 75.1 | 20.3 | 10.9 | 85.1 | 64.5 | 29.1 |
| | Gloss 45° | % | 15.7 | 53.8 | 62.1 | 13.8 | 21.2 | 48.1 |
| Bumper Compression | Load @ 0.5 in deflection | N | 102 | 97 | 91 | 91 | 98 | 54 |
| Top Load | Maximum Load | N | 135 | 109 | 109 | 136 | 116 | 72 |
| Drop Test (6 ft) | Vertical | Fail/Pass | 10/12 | 0/12 | 0/12 | 1/12 | 4/12 | 0/12 |
| | Horizontal | Fail/Pass | 0/12 | 1/12 | 0/12 | 0/12 | 1/12 | 0/12 |

Samples (2 mil films), using the sample materials, were cast on a small pilot scale cast line equipped with a 1¼ inch Welex extruder and an 8 inch coat hanger die. A two zone die heat of 380° F. was used and the barrel heats of 350, 360, and 370° F. were used for zones 1, 2 and 3, respectively. A cast roll temperature of 60° F. was used on a three-roll stack. Sample properties are provided in Table 7.

TABLE 7

Description of pilot plant samples used for study.

| Description Material ID | Control 7C92 | Low IV 7C93 | Very low IV 7C94 | Bimodal matrix 7C95 | Low R ratio 7C97 | RaHeCo 7C99 |
|---|---|---|---|---|---|---|
| Continuous | | | | | | |
| Phase MFR | 13-15 | 9-11 | 6-8 | 1.5-2.0/13-15 | 13-15 | 13-15 |
| Final MFR | 7.2 | 6.8 | 6 | 5.8 | 7.9 | 7.3 |
| IV Rubber | 2.6 | 1.8 | 1.4 | 2.4 | 2.2 | 2 |
| C2 content | 10.3 | 10.9 | 8.1 | 12 | 7.8 | 9.4 |
| R ratio (target) | 0.41 | 0.41 | 0.41 | 0.41 | 0.32 | 0.32 |

Collected films were evaluated for haze with a BYK Gardner Hazegard Plus System using methodology consistent with ASTM D1003 procedure "A". Gloss was evaluated a BYK Gardner micro-gloss glossmeter in accordance with a method based on ASTM D-2457-70. Physical properties were measured on 1 inch strips of film cut in the machine direction. Testing was conducted on Instron model 1122. Dart drop and Elmendorf tear testing were tested in accordance with ASTM D1709 and ASTM D1922-89, respectively. Puncture resistance was measured on 2 mil cast films with an Instron using a 3.17 mm diameter tip and a run speed of 20 in/min. Results from testing appear in Table 8.

TABLE 8

Physical property results for 2 mil cast films.

| Description | 7C92 | 7C93 | 7C94 | 7C95 | 7C97 | 7C99 | Units |
|---|---|---|---|---|---|---|---|
| Haze | 74 | 29 | 6 | 81 | 59 | 52 | % |
| Gloss, 45 | 8 | 20 | 63 | 6 | 10 | 12 | % |
| 1% Secant Mod | 90 | 89 | 105 | 87 | 94 | 56 | kpsi |
| Tens Str @ yield | 2600 | 2600 | 3000 | 2400 | 2700 | 2200 | psi |
| Elongation @ yield | 8.8 | 9.4 | 10.3 | 8 | 9.7 | 14.1 | % |
| Dart Drop | 480 | 490 | 500 | 340 | 570 | >1200 | g |
| Elmendorf Tear MD | 160 | 180 | 240 | 160 | 160 | 190 | g |
| Film Puncture | 1.7 | 2.1 | 1.9 | 1.6 | 2.1 | 1.8 | in-lbs |

In order to verify that the result translates into other sample forms, each material was used to injection mold step chips and the haze was measured on each step where applicable. The results appear in Table 9. Injection molding was performed on a Toshiba ISE 170 hydraulic injection molder equipped with a step chip mold designed by Axxicon.

TABLE 9

Haze values from molded step chips (reported as %)

| | 7C92 | 7C93 | 7C94 | 7C95 | 7C97 | 7C99 |
|---|---|---|---|---|---|---|
| Haze (20 mil) | 93.6 | 73.4 | 39 | N/A | 90.2 | 82.5 |
| Haze (40 mil) | N/A | 96.1 | 71.9 | N/A | N/A | 98.9 |
| Haze (60 mil) | N/A | N/A | 85.8 | N/A | N/A | N/A |
| Haze (80 mil) | N/A | N/A | 95.7 | N/A | N/A | N/A |

The experiments examined the effect of lowering the rubber IV, lowering R ratio, the use of a bimodal continuous phase, and the use of a random copolymer continuous phase in an impact copolymer system. Film, injection molded parts, and ISBM bottles showed similar trends in the resin performance. A small improvement in optics occurred by creating more chemically similar phases, as demonstrated by the lower R ratio (7C95) and RaHeCo (7C99) samples. However, the most marked improvement in optics is seen with lowering the rubber IV. The greatest improvement was found when the two phases approximately match in viscosity. Reduction in rubber IV significantly compromised impact resistance at −4° F. However, at ambient and even subambient (32° F. for injection molded parts and 40° F. for ISBM bottles) there was not a significant loss in impact strength (instrumented impact and drop testing) for materials with lower rubber IV. The results suggest that the optics of an impact copolymer can be significantly improved simply by lowering the IV of the rubber. This does increase the stiffness of the resin and slightly lowers the impact strength but the changes are minor except at extremely low temperature.

A lower MFR heterophasic polymer for blown film was created utilizing a similar approach as above such that a lower IV was used to improve the clarity of the film. The results are shown in Table 10 below for a 2 mil film. In this case, the IV of the rubber was lowered from 2.4 dl/g in the control to 1.9 dl/g and 1.5 dl/g. Samples were used to produce blown films of a 2 mil thickness. The haze dropped progressively in samples with lower rubber IV again demonstrating the effect of lower rubber IV in improving material clarity.

TABLE 10

Physical Properties of lower MFR polymers.

| Value | 8C30 Control | 8C31 Low IV | 8C36 Lowest IV |
|---|---|---|---|
| R ratio | 0.4 | 0.4 | 0.4 |
| MFR Pellets | 0.8 | 1.11 | 1.69 |
| MFR Homo | 0.9 | 1.3 | 1.4 |
| % C2 Homo | — | — | — |
| Rubber IV | 2.4 | 1.9 | 1.5 |
| C2 tot (NIR) | 10.7 | 10.5 | 11.2 |
| Haze (%) | 48.1 | 31.1 | 22 |

While various embodiments have been shown and described, modifications thereof can be made by one skilled in the art without departing from the spirit and teachings of the disclosure. The embodiments described herein are exemplary only, and are not intended to be limiting. Many variations and modifications of the embodiments disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments disclosed herein. The discussion of a reference herein is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of preparing an impact copolymer, said method comprising:
    selecting a continuous phase propylene polymer or propylene copolymer;
    selecting a rubber phase polymeric material comprising ethylene/propylene rubber, wherein said impact copolymer has a R ratio of from 0.25 to less than 0.41, wherein the R ratio is the percentage by weight of ethylene in the rubber in the rubber phase, as determined by NMR, wherein said rubber phase polymeric material has an intrinsic viscosity lower than the viscosity of said continuous phase polymer;
    wherein the impact copolymer has an Mn ranging from 25,000 to 80,000, an Mw ranging from 150,000 to 450,000 and an Mz ranging from 450,000 to 1,500,000.

2. The method of claim 1 wherein said rubber phase polymeric material has an intrinsic viscosity of from 1.4 dl/g to 2.4 dl/g.

3. The method of claim 1 wherein said rubber phase polymeric material is evenly distributed within the impact copolymer.

4. The method of claim 3 wherein said impact copolymer has a rubber phase particle size of from 0.7 to 2.7 μm.

5. The method of claim 1 wherein said continuous phase polymer comprises a random ethylene-propylene copolymer.

6. An impact copolymer prepared by the method of claim 1.

7. The impact copolymer of claim 6 wherein said impact copolymer has an ethylene content of from 6 wt % to 15 wt %.

8. The impact copolymer of claim 7 wherein said rubber phase polymeric material has an intrinsic viscosity of from 1 dl/g to 2 dl/g.

9. A film produced from said impact copolymer of claim 6.

10. The film of claim 9 having a haze value of a 2 mil. thick sample of from 5 to 8%.

11. The film of claim 9 having a gloss value at 45° of a 2 mil. thick sample of from 50 to 70%.

12. A molded article produced from said impact copolymer of claim 6.

13. The method of claim 1, wherein the continuous phase is a propylene homopolymer comprising less than 0.5 wt. % of comonomer.

14. The method of claim 1, wherein the continuous phase is a propylene homopolymer comprising less than 0.1 wt. % of comonomer.

15. The method of claim 1, wherein the impact copolymer comprises greater than 10 wt. % ethylene.

16. The method of claim 1, wherein the impact copolymer comprises greater than 12 wt. % ethylene.

17. The method of claim 1, wherein the impact copolymer comprises greater than 14 wt. % ethylene.

18. The method of claim 1, wherein the impact copolymer comprises at most 20 wt. % of the rubber phase polymeric material.

19. An impact copolymer comprising:
    a continuous phase a propylene homopolymer or propylene copolymer; and
    a rubber phase polymeric material comprising ethylene/propylene rubber, wherein the impact copolymer has a R ratio of from 0.25 to less than 0.41, wherein the R ratio is the percentage by weight of ethylene in the rubber in the rubber phase, as determined by NMR, wherein the rubber phase polymeric material has an intrinsic viscosity lower than the viscosity of said continuous phase polymer;
    wherein the impact copolymer has an Mn ranging from 25,000 to 80,000, an Mw ranging from 150,000 to 450,000 and an Mz ranging from 450,000 to 1,500,000.

* * * * *